United States Patent [19]
Reynolds et al.

[11] 3,726,553
[45] Apr. 10, 1973

[54] TWO-PART PULL TYPE POSITIVE LOCK FASTENERS

[75] Inventors: Perry J. Reynolds, Detroit, Mich.; John F. Orloff, Saint Clair Shore, both of Mich.

[73] Assignee: Huck Manufacturing Company

[22] Filed: July 9, 1971

[21] Appl. No.: 161,205

[52] U.S. Cl. .................. 287/189.36 D, 85/39, 85/77
[51] Int. Cl. ............................................. F16b 5/04
[58] Field of Search............ 287/189.36 D, 189.36 F, 287/189.36 C; 85/39, 70, 77, 37, 78

[56] References Cited

UNITED STATES PATENTS

| 3,515,419 | 7/1968 | Baugh | 287/189.36 F |
| 3,365,998 | 1/1968 | Zahodiakin | 85/70 |
| 3,279,304 | 10/1966 | Hopkins | 85/77 |
| 3,204,517 | 9/1965 | Looker | 85/77 |
| 3,464,310 | 9/1969 | Lambert | 85/39 |
| 3,515,028 | 6/1970 | Patton | 85/77 |

Primary Examiner—David J. Williamowsky
Assistant Examiner—Wayne L. Shedd
Attorney—J. King Harness et al.

[57] ABSTRACT

A two-piece fastener, including a headed pin and a sleeve with the sleeve being set by engagement with the head of the pin and with the pin and sleeve being mechanically locked by the formation of an interlock between the underside of the pinhead and the sleeve in the setting of the fastener.

10 Claims, 13 Drawing Figures

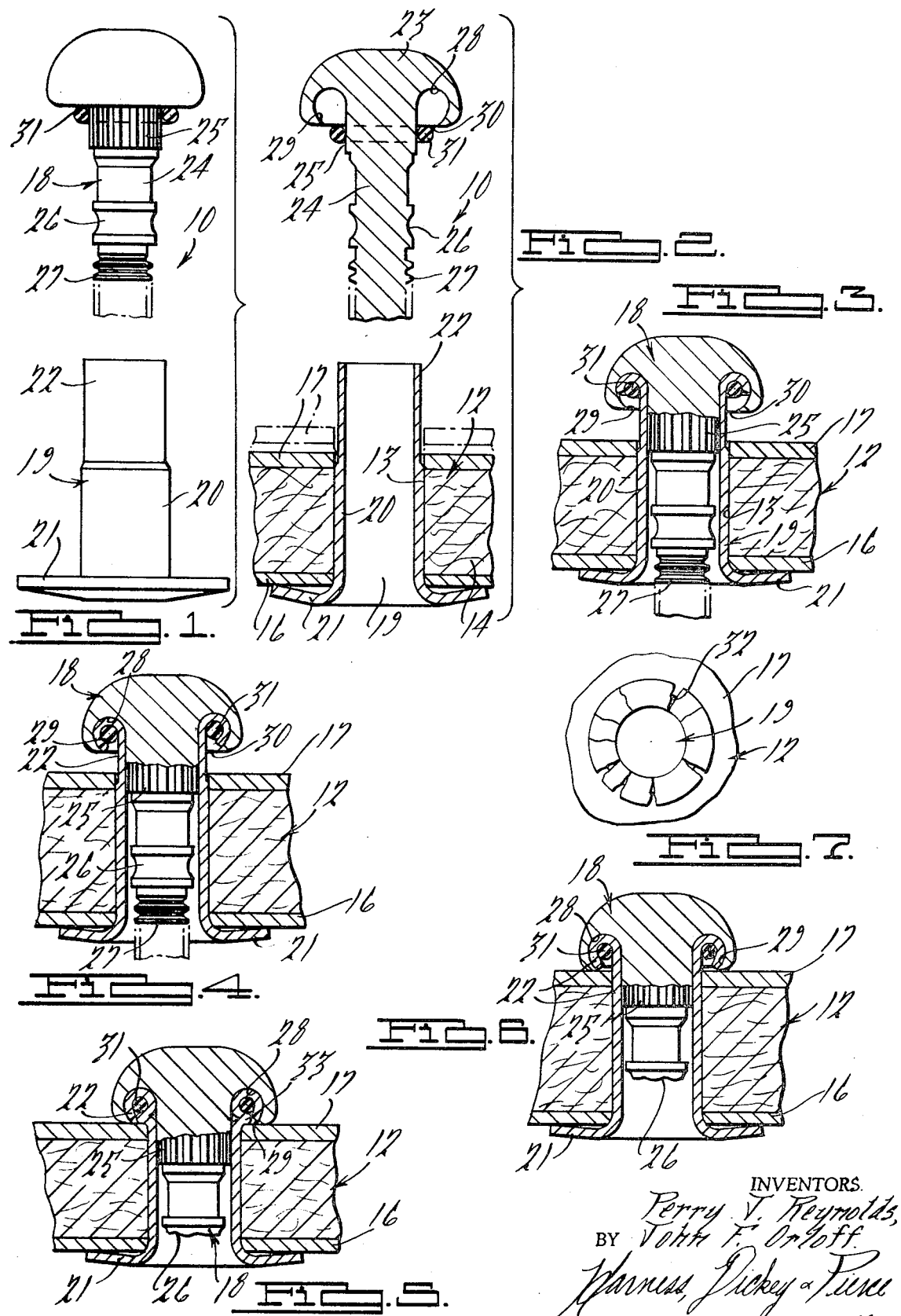

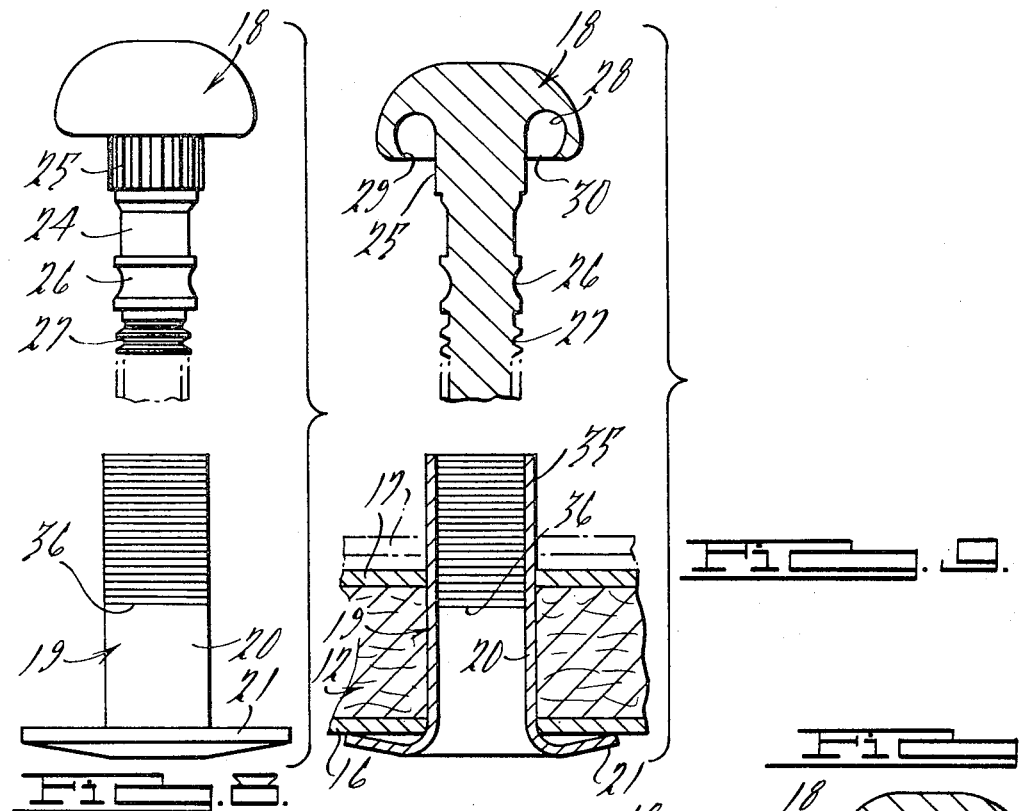
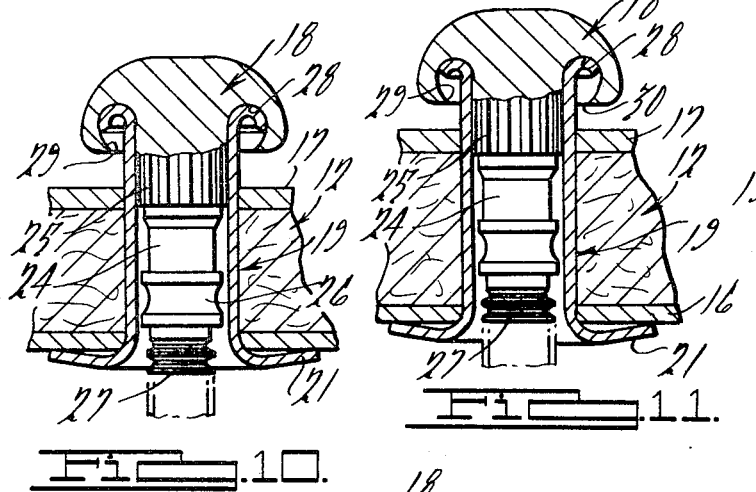
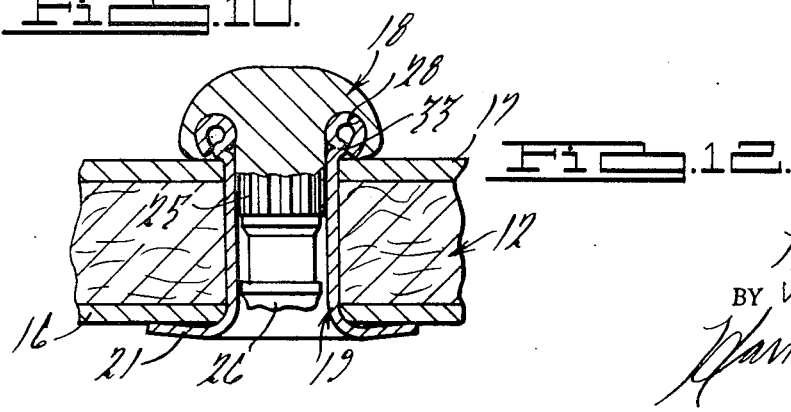

TWO-PART PULL TYPE POSITIVE LOCK FASTENERS

The present invention relates to a container fastener of the general type disclosed in Baugh U.S. Pat. No. 3,515,419, issued June 2, 1970.

The present invention relates to a two-piece fastener including a headed pin and a sleeve. It is primarily adapted for large shipping containers in which the inner part of the fastener is substantially flush with the inside wall of the container and the outer side of the fastener is of such a design and configuration that any tampering with the fastener will result in a distruction of the fastener making the tampering self-evident.

The fastener is of the pull type. The sleeve is inserted through openings in the container from the inside surface of the container wall and the pin is inserted into the sleeve from the outside. The pin is of the pull type preferably having pull grooves and a breakneck. The underside of the pinhead is provided with a reversely formed curl so that as the end of the sleeve is projected into the curl, such end is caused to curl forming a mechanical interlock between the pin and the sleeve for both minimum and maximum grips.

In the prior art, a friction grip only is provided between the pin and the sleeve and the fastener was, therefore, sensitive to the formation of the openings through the container wall. Experience has shown that as a practical matter, sufficient care is not taken in the formation of such holes and the friction grip in many instances is insufficient to assure pin retention in the sleeve.

A primary object of the present invention is to provide a fastener of the type described above which is practically insensitive to field variations in hole formation so that the fastener parts remain secured together in use. In the fastener of the present invention, the pin and sleeve are held together by a positive, mechanical interlock between the pin and the sleeve. The sleeve and pin are designed so that this interlock is accomplished for minimum and maximum grips. By way of comparison where a friction lock was provided, the pin push out is in the order of 350 to 400 pounds even when used with properly prepared holes, while with the present invention the push out is in the order of 1,400 to 1,500 pounds even where the holes are formed with considerable intolerance.

Other objects of the present invention will become apparent from the following specification and drawings related thereto and from the claims hereinafter set forth.

In the drawings in which like numerals indicate like parts in use throughout:

FIGS. 1 through 7 illustrate one embodiment of the present invention; and

FIGS. 8 through 12 illustrate another embodiment of the present invention.

FIG. 1 is a separated elevational view of the pin and sleeve of the present invention with one of the elements, namely, an O-ring sealer shown in cross section;

FIG. 2 is a cross sectional view generally similar to FIG. 1, and showing the sleeve inserted in position through an opening in the wall of the container. The solid lines illustrate minimum grip and the dotted lines indicate maximum grip;

FIG. 3 is a view similar to FIG. 2 showing the pin inserted in the sleeve end in an intermediate driving position for minimum grip;

FIG. 4 is a view similar to FIG. 3 for maximum grip;

FIG. 5 is a view similar to FIG. 3 for minimum grip and showing the finally set fastener;

FIG. 6 is a view similar to FIG. 4 for maximum grip and showing the finally set fastener;

FIG. 7 is an end view of the sleeve as the sleeve end begins to curl with the pin removed;

FIG. 8 is a view similar to FIG. 1 for a modified form of the present invention;

FIG. 9 is a view similar to FIG. 2 for this modification;

FIGS. 10 and 11 are intermediate views in the setting of the fastener for minimum and maximum grip respectively; and FIGS. 12 and 13 are views showing the finally set fastener for minimum and maximum grip respectively;

DESCRIPTION OF THE PREFERRED EMBODIMENT

Referring to FIGS. 1 through 7, the fastener assembly generally indicated at 10 is shown with a wall structure of a shipping container generally indicated at 12. Such structure has an opening 13 therethrough and one of the conventional types of such container includes a fibrous or wood intermediate member 14 with metal outer members 16 and 17. Minimum grip is illustrated in the solid lines and maximum grip by the broken lines in FIG. 2.

The assembly 10 includes a pin generally indicated at 18 and a sleeve generally indicated at 19. The sleeve 19 is in the form of a tubular shank 20 having an enlarged head 21. In this embodiment the outer diameter of the leading end of the sleeve is reduced as shown at 22 to provide a reduced wall section as best shown in FIG. 2.

The sleeve is inserted through the opening 13 formed by aligned openings through the members 14, 16 and 17 with the reduced end 22 projecting therebeyond, the metal panel 17 representing the outside of the container.

The pin 18 has a head 23 and a shank 24. The shank has a longitudinally knurled section 25 formed adjacent the underside of the head 23, for a purpose hereafter described. The pin also has a reduced breakneck section 26 with the leading end having pull grooves 27 formed thereon.

According to the present invention, the underside of the head 23 is formed with a symmetrical and annular curled surface 28, the end of which as indicated at 29 projects toward the shank of the pin forming an annular symmetrical opening 30.

A rubber O-ring 31 is slipped onto the shank of the pin adjacent the head where such sealing member is desired.

The pin 18 is inserted into the tubular sleeve 19 with the pull groove portion 27 projecting inwardly beyond the head 21 of the sleeve. Such pull portion is engaged by a known type of pull gun which engages the pin and pulls it into the sleeve. The longitudinal serrations 25 are of such dimension relative to the I.D. of the sleeve portion 22 that as such serrations engage the inside surface of the sleeve portion 22, longitudinally weakened sections are formed in that portion of the sleeve so that as the sleeve portion 22 is caused to curl during the setting of the fastener, longitudinal fissures 32, as shown in FIG. 7, are formed in the leading end of the sleeve 22 which assist in the curling of the leading end of the sleeve 19.

The leading end of the sleeve 19 enters the curled portion of the head through opening 30 and is caused to curl as shown in FIGS. 3 to 6. The leading end of the sleeve follows the contour of the curl 28 so that it too is reversely curled adjacent annular portion 29 of the under edge of the pinhead. This is true for both minimum and maximum grip so that a positive mechanical interlock is provided between the pin and the sleeve. In the case of minimum grip, as the curling is completed, the remaining portion of the sleeve may form an annular bulb 33, as best shown in FIG. 5. In some installations, such bulb may be formed in the column of the sleeve within the wooden section 14.

When the fastener is completely set as shown in FIGS. 5 and 6, the set is caused to break at the breakneck 26 and such breakneck is located so that it is inside the head 21 of the sleeve.

Where a sealing ring is desired, as illustrated by the rubber O-ring 31, during the setting of the fastener, the leading end of the sleeve 22 will force the O-ring 31 through the opening ahead of it into the curled portion and the end 22 will also force itself under the O-ring 31 so that when the fastener is finally set the O-ring is squeezed within the curled portion of the sleeve to form the seal.

Referring to FIGS. 8 to 12, a modified form of a fastener of the present invention is illustrated. The sealing O-ring is not shown in this illustration but, of course, may be used, if desired.

The pin 18 is the same in detail as the pin of the previously described embodiment in that it includes the head 23, shank 24, longitudinal serrations 25, breakneck 26, and pull grooves 27. The underside of the head is provided with a full curl 28 with the inwardly projecting annular edge 29 defining the opening 30.

In this embodiment, the sleeve 19 is modified in that the wall portion 20 and the leading end portion 35 are uniform internal and external diameter throughout the length so that the wall thickness is uniform throughout its length. However, in this embodiment the leading end portion 35 is annealed from the leading end thereof to a position along the sleeve indicated by broken lines at 36 so that the annealed portion 35 will be relatively softer than the remaining portion of the sleeve and will project beyond the outer wall of the container for both minimum and maximum grip.

The assembly and setting of the fastener is the same as in the embodiment previously described so that the end portion 35 projects through the opening 30 engaging the curled surface 28 causing it to reversely curl as shown in FIGS. 10, 11, 12 and 13 to provide the same form of interlock as in the embodiment previously described. The serrations 25 on the pin also serve the same function, that is, forming the weakened sections in the wall of the leading end to form longitudinal fissures in such end as the end curls. The mechanical interlock between the pin and the sleeve is the same.

While it will be apparent that the invention herein disclosed is well calculated to achieve the benefits and advantages as herein above set forth, it will be appreciated that the invention is susceptible to modification, variation and change without departing from the spirit thereof.

We claim:

1. A two-piece fastener for fastening workpieces having aligned openings comprising: a tubular sleeve having an enlarged sleeve head engageable with one surface at one side of the workpieces and a sleeve shank extending through openings and beyond the opposite surface at the other side of the workpieces, a pin having a pinhead engageable with the outer end of said sleeve shank opposite said sleeve head and having a pin shank extending through said sleeve and beyond said sleeve head, pull means on said pin shank adapted to be gripped by a tool whereby a relative axial force can be applied between said pin and said sleeve, a breakneck groove defining the weakest point of said pin shank and located intermediate said pinhead and said pull means, said pinhead being of a size to overengage the leading end of the sleeve and having deformation means in the form of an annular surface terminating in an inwardly curved annular edge defining an annular opening through which the leading end of the sleeve is received into a cavity formed on the under side of the pinhead, with the portion of the sleeve adjacent the leading end thereof deformed outwardly beyond said inwardly curved annular edge of the pinhead to provide a mechanical interlock means between the pin and the sleeve to prevent same from disengaging, and wherein a radial dimension of the inwardly curved under edge of the pinhead is less than an outermost radial dimension of the curled leading end of the sleeve to effect said mechanical interlock means.

2. A fastener according to claim 1 in which the leading end of the sleeve shank is of a reduced wall thickness compared to the wall thickness of the remaining portion of the sleeve shank.

3. A fastener according to claim 1 in which the pin shank is provided with longitudinally extending serrations adjacent the pinhead, said serrations being of such dimensional radial extension relative to the internal diameter of the leading end of the sleeve shank as to form weakened sections in said sleeve shank which cause fissures therein as the leading end of the sleeve shank is curled to provide the mechanical interlock between the pin and sleeve.

4. A fastener according to claim 3 in which the leading end of the sleeve shank is of a reduced wall thickness compared to the wall thickness of the remaining portion of the sleeve shank.

5. A fastener according to claim 1 in which the leading end of the sleeve shank is annealed to a lesser hardness than the remaining portion of the sleeve shank.

6. A fastener according to claim 1 in which an O-ring sealing means is positioned within the curled portion of sleeve and pinhead for forming a seal.

7. A fastener according to claim 2 in which an O-ring sealing means is positioned within the curled portion of sleeve and pinhead for forming a seal.

8. A fastener according to claim 3 in which an O-ring sealing means is positioned within the curled portion of sleeve and pinhead for forming a seal.

9. A two-piece fastener for fastening workpieces having aligned openings comprising: a tubular sleeve having an enlarged sleeve head engageable with one surface at one side of the workpieces and a sleeve shank extending through openings and beyond the opposite surface at the other side of the workpieces, a pin having a pinhead engageable with the outer end of said sleeve shank opposite said sleeve head and having a pin shank extending through said sleeve and beyond said sleeve head, pull means on said pin shank adapted to be gripped by a tool whereby a relative axial force can be applied between said pin and said sleeve, a breakneck groove defining the weakest point of said pin shank and located intermediate said pinhead and said pull means, said pinhead being of a size to overengage the leading end of the sleeve and having deformation means in the form of an annular surface terminating in an inwardly curved annular edge defining an annular opening through which the leading end of the sleeve is received into a cavity formed on the under side of the pinhead, with the portion of the sleeve adjacent the leading end thereof deformed outwardly beyond said inwardly curved annular edge of the pinhead to provide a positive mechanical interlock means between the pin and the sleeve to prevent same from disengaging.

10. A fastener according to claim 9 in which an O-ring sealing means is positioned within the curled portion of the sleeve and pinhead for forming a seal.

* * * * *